Figure 1:
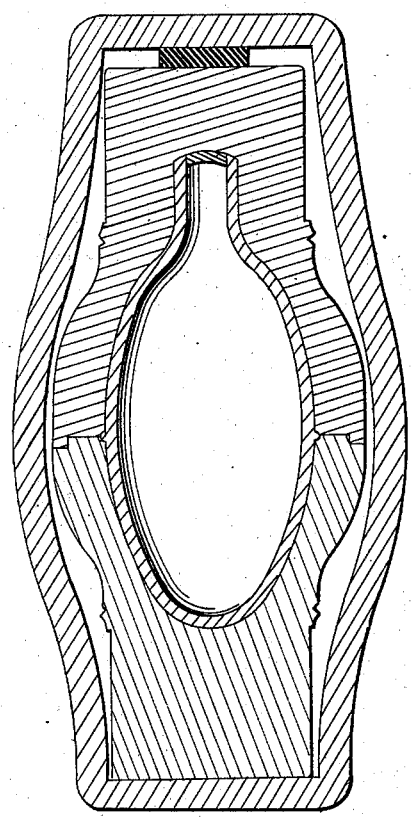
Figure 2:
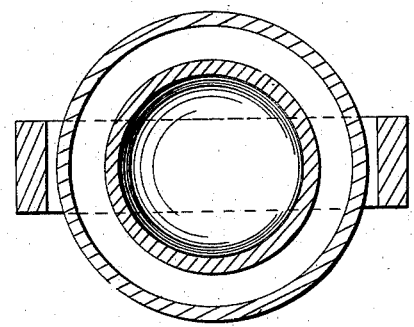

D. D. Parmelee,
Vulcanizing Apparatus,

N° 26,551. Patented Dec. 20, 1859.

UNITED STATES PATENT OFFICE.

DU BOIS D. PARMELEE, OF SALEM, MASSACHUSETTS, ASSIGNOR TO JOHN A. GREENE, OF BEVERLY, MASSACHUSETTS.

MANUFACTURE OF INDIA-RUBBER HOLLOW MOLDED ARTICLES.

Specification of Letters Patent No. 26,551, dated December 20, 1859.

*To all whom it may concern:*

Be it known that I, Du Bois D. Parmelee, of Salem, in the county of Essex and State of Massachusetts, have invented a new and useful Method or Process of Making Hollow Molded Articles from India-Rubber or its Compounds; and I hereby declare the following to be a full and clear description thereof, reference being had to the accompanying drawing, making part of this specification.

The method heretofore adopted of making hollow molded articles from india rubber or its compounds by the Goodyear process has many disadvantages. The rubber has had necessarily admixed with it sulfur to effect the vulcanization by heat of the molded article. This as a general thing precludes the admixture with the rubber of clay, oxids, carbonates, and other earthy substances and that in many cases would be found serviceable and are calculated to secure finer lines to the article in the impression it receives from the mold. I also, in the case the article being spoiled in or turning out defective from the mold, and which is often unavoidable, occasions serious loss of time, labor, fuel and material, as the article being vulcanized as it issues from the mold makes the rubber comparatively of no value. In such process, heat too is absolutely necessary alike to effect the vulcanization of the goods as to accomplish the molding of them, which is done by inserting a bag of prepared rubber in the mold, after the bag has been closed with one or more drops of water placed inside it, and then subjecting the whole to the action of heat of a high temperature, which, while it perfects the vulcanization of the rubber, converts the water inside the bag into steam or vapor that presses out the bag against the sides of the mold and gives to the rubber the form and impression of the mold.

My present process for the manufacture of like articles dispenses with the application of heat, either to effect the vulcanization or molding of the article. It also, by employing crude rubber in contradistinction to rubber prepared with sulfur as heretofore, admits of the advantageous admixture with the rubber of various earthy substances as previously referred to; and in cases of defective molding the spoiled articles being of unvulcanized rubber are in point of material as valuable as ever and suitable to be worked over again, which is a very important consideration in manufacturing on a large scale. Besides these, there are other advantages for this my present described method, but it is unnecessary to speak of them here and I shall now proceed briefly to describe my new process.

I form a closed bag of india rubber or its compounds free from admixture with sulfur as necessary under the Goodyear process of vulcanization. Such bag may be made from sheets of rubber cut and joined to approximate in rough outline the figure designed to be molded. I then place said bag in a divided mold of the desired interior configuration, and properly securing said molds together, put them and the bag contained within them under the receiver of an air pump. This done, I exhaust the air from the receiver in order to produce a partial or perfect vacuum, within the molds or between the interior surface or surfaces thereof and the outer surface of the closed bag, by the escape of the air from said intervening space through the joints of the mold or through any suitable opening left for the purpose. A vacuum thus established on the outside of the bag and between it and the molds causes the air within the bag to expand the latter and make it conform to the inside configuration of the mold and which shape the bag, after it has been subjected to such expansion for the necessary interval of time, will retain, on its removal from the receiver and molds.

The time of exposure to expansion will of course vary with the thickness of the sheets of which the bags are formed, or with the degree of rarefaction produced between the molds and bag when under the receiver, or as other circumstances may render necessary. On removal of the rubber figure from the molds, it may be punctured to admit air of full atmospheric pressure; or, air of full atmospheric pressure may be made to freely enter the bag when being molded as described by, in the case of an article being manufactured requiring an opening to be left in it—such as a bottle—arranging the molds, containing the bag, in a chest, with the neck or open portion of the article in free communication with the air on the outside of the chest, and then, by pumping the air from the interior of the chest, which may be of size to accommodate a series of molds and be connected by pipe with an air pump. The article or articles thus molded, I afterward treat in the cold way, to effect the "change" by dipping them in any suitable hermizing solution.

The drawings accompanying this specification represent two sectional views of a mold with its clamps containing an india rubber syringe bulb in a state of completion as manufactured by the process herein described.

Having thus described my invention and the manner in which it is carried into effect, what I claim as my invention and desire to secure by Letters Patent is—

Making hollow articles of India rubber or its equivalent or their compounds, when the same are to be treated in the cold way, after molding, to effect the "change" as described, by shaping the atricles in molds, from bags formed of such rubber, and exhausting the air from between said molds and the bags substantially as herein set forth.

In testimony whereof I have signed my name to this specification before two subscribing witnesses.

DU BOIS D. PARMELEE.

Witnesses:
A. POLLAK,
EDW. F. BROWN.